United States Patent
Su

(12) 
(10) Patent No.: US 9,687,076 B2
(45) Date of Patent: Jun. 27, 2017

(54) DISPLAY APPARATUS

(71) Applicants: Qisda (Suzhou) Co., Ltd., Suzhou (CN); Qisda Corporation, Taoyuan (TW)

(72) Inventor: Yung-Chun Su, Taoyuan (TW)

(73) Assignees: Qisda (Suzhou) Co., LTD., Suzhou (CN); Qisda Corporation, Taoyuan (TW)

( * ) Notice: Subject to any disclaimer, the term of this patent is extended or adjusted under 35 U.S.C. 154(b) by 58 days.

(21) Appl. No.: 14/617,962

(22) Filed: Feb. 10, 2015

(65) Prior Publication Data
US 2015/0257299 A1     Sep. 10, 2015

(30) Foreign Application Priority Data

Mar. 5, 2014 (TW) .............................. 103107378 A

(51) Int. Cl.
*F16M 13/00* (2006.01)
*A47B 97/00* (2006.01)
*G06F 1/16* (2006.01)

(52) U.S. Cl.
CPC ............ *A47B 97/00* (2013.01); *G06F 1/1601* (2013.01); *G06F 1/166* (2013.01); *G06F 1/1626* (2013.01); *A47B 2097/005* (2013.01); *G06F 2200/1612* (2013.01)

(58) Field of Classification Search
CPC ........... F16M 2200/041; F16M 13/005; F16M 2200/08; G06F 1/166; Y10S 248/919
See application file for complete search history.

(56) References Cited

U.S. PATENT DOCUMENTS

| | | | | |
|---|---|---|---|---|
| 6,570,627 B1* | 5/2003 | Chang | .................... | F16M 11/10 248/917 |
| 6,698,063 B2* | 3/2004 | Kim | ...................... | F16M 11/10 16/337 |
| 6,859,356 B2* | 2/2005 | Chih | ....................... | F16M 11/10 361/679.21 |
| 6,997,422 B2* | 2/2006 | Sweere | ................... | F16M 11/04 248/123.11 |
| 7,621,490 B2* | 11/2009 | Tseng | ..................... | F16M 11/04 248/157 |
| 7,856,695 B2* | 12/2010 | Tang | ....................... | F16M 11/10 16/340 |

(Continued)

FOREIGN PATENT DOCUMENTS

| CN | 101149988 A | 3/2008 |
|---|---|---|
| CN | 201117307 Y | 9/2008 |

(Continued)

*Primary Examiner* — Bradley Duckworth

(57) ABSTRACT

A display apparatus including a display unit and a support device is provided. The support device is connected to the display unit to support the display unit on a flat surface with a supporting angle. The support device includes a support bracket, a pivot unit and a constant force spring. The support bracket has a pivot hole. The pivot unit is pivotally connected to the pivot hole of the support bracket and connected to the display unit. The constant force spring has a spring body coupled with the pivot unit. When the supporting angle changes in a predetermined range, an end portion of the spring body is movably connected to the support bracket.

13 Claims, 13 Drawing Sheets

(56) References Cited

U.S. PATENT DOCUMENTS

| | | | | |
|---|---|---|---|---|
| 8,146,869 B2 * | 4/2012 | Wang | F16M 11/00 | 248/122.1 |
| 8,149,572 B2 * | 4/2012 | Shen | F16M 11/04 | 248/349.1 |
| 8,226,054 B2 * | 7/2012 | Chen | F16M 11/10 | 16/337 |
| 8,733,716 B2 * | 5/2014 | Li | F16M 11/041 | 248/188 |
| 8,749,961 B2 * | 6/2014 | Hong | F16M 11/10 | 248/276.1 |
| 8,763,969 B2 * | 7/2014 | Wu | F16M 11/10 | 248/123.11 |
| 8,922,995 B2 * | 12/2014 | Su | F16M 11/10 | 248/917 |
| 8,925,154 B2 * | 1/2015 | Ergun | H01H 85/24 | 16/342 |
| 8,950,725 B2 * | 2/2015 | Huang | F16M 11/105 | 248/121 |
| 9,030,813 B2 * | 5/2015 | Chang | G06F 1/1633 | 361/679.27 |
| 9,072,179 B2 * | 6/2015 | Su | F16M 11/10 | |
| 9,255,661 B2 * | 2/2016 | Quijano | F16M 11/18 | |
| 2004/0011932 A1 * | 1/2004 | Duff | F16M 11/08 | 248/157 |
| 2005/0270732 A1 * | 12/2005 | Titzler | G06F 1/1601 | 361/679.22 |
| 2006/0032998 A1 * | 2/2006 | Depay | F16M 11/10 | 248/291.1 |
| 2007/0163081 A1 | 7/2007 | Lu | | |
| 2008/0256748 A1 * | 10/2008 | Saito | F16M 11/10 | 16/321 |
| 2008/0302926 A1 * | 12/2008 | Cheng | F16M 11/105 | 248/161 |
| 2010/0187376 A1 * | 7/2010 | Su | F16M 11/10 | 248/157 |
| 2011/0062304 A1 * | 3/2011 | Hsieh | F16M 11/00 | 248/372.1 |
| 2014/0063772 A1 * | 3/2014 | Kurachi | H05K 7/16 | 361/809 |
| 2014/0117199 A1 * | 5/2014 | Liu | F16M 13/00 | 248/688 |
| 2015/0250064 A1 * | 9/2015 | Lee | F16M 11/10 | 248/372.1 |

FOREIGN PATENT DOCUMENTS

| | | |
|---|---|---|
| CN | 201134272 Y | 10/2008 |
| TW | M396569 U1 | 1/2011 |

* cited by examiner

DISPLAY APPARATUS

FIELD OF THE INVENTION

The present invention relates to a display apparatus, and more particularly to a display apparatus capable of being positioned within a large angle range.

BACKGROUND OF THE INVENTION

Conventionally, display apparatus is mainly used to display information. Thus, the display apparatus usually stands on a desktop and is tilted, through a support bracket, with respect to the desktop at a small angle. Today, with the development of touch technology and change of usage habits, display apparatus is not only used for information display but also has touch input function. However, when the display apparatus stands on a desktop and is tilted with respect to the desktop at a small angle, the force resulted by the touch input may cause the display apparatus to be shaking, which may further lead to a difficult information input and even a damage on the display apparatus.

Moreover, because generally using drawstrings as the elastic recovery mechanism for drawing spring to provide support force, the conventional support bracket may have complex reciprocal mechanism and assembly process. Furthermore, the support force provided by the reciprocal mechanism using drawstrings is limited, and accordingly the weight of the display apparatus supported by the support bracket is limited.

SUMMARY OF THE INVENTION

The present invention provides a display apparatus, which includes a display unit and a support device. The support device is connected to the display unit to support the display unit on a flat surface with a supporting angle. The support device includes a support bracket, a pivot unit and a constant force spring. The support bracket has a pivot hole. The pivot unit is pivotally connected to the pivot hole of the support bracket and connected to the display unit. The constant force spring has a spring body coupled with the pivot unit. When the supporting angle changes in a predetermined range, an end portion of the spring body is movably connected to the support bracket.

In one embodiment, the support bracket has a groove, and the end portion moves along the groove while the support bracket rotates with respect to the display unit.

In one embodiment, the support device further includes a torsion spring. The support bracket further has a slot hole. The torsion spring is axially mounted on the pivot unit and close to the constant force spring. One end of the torsion spring is clamped in the slot hole. The torsion spring and the constant force spring corporately make the support device support the display unit on the flat surface with the supporting angle and make the support bracket reciprocally rotate with respect to the display unit.

In one embodiment, the support device further includes a limiting unit disposed on the pivot unit and close to the support bracket. The limiting unit limits the supporting angle to a maximum rotation angle.

In one embodiment, when the supporting angle is less than the maximum rotation angle, the support bracket automatically returns back to an initial position by using the constant force spring. When the supporting angle reaches to the maximum rotation angle, the support bracket is limited, by the limiting unit, to fix at a position and does not automatically return back to the initial position.

In one embodiment, the limiting unit includes a first washer and a second washer. The first washer has a first stopper portion and the second washer has a second stopper portion. When the support bracket rotates with respect to the display unit, the first washer rotates with respect to the second washer and thereby moving the first and second washers either toward or away from each other.

In one embodiment, when the support bracket rotates with respect to the display unit to the maximum rotation angle, the first and second stopper portions interfere with each other to limit the support bracket to further rotate with respect to the display unit.

In one embodiment, the support device further includes a case for containing the support bracket, the pivot unit and the constant force spring therein.

In one embodiment, the case and the flat surface are substantially parallel to each other when the support bracket rotates with respect to the display unit to the maximum rotation angle.

In one embodiment, the case has a handle structure, through which the case can be held.

In one embodiment, one end of the case has a cambered surface, through which the case and the flat surface have a line contact while the support device supports the display unit on the flat surface.

The present invention further provides a display apparatus, which includes a display unit and a support device. The support device is connected to the display unit to support the display unit on a flat surface with a supporting angle. The support device includes a support bracket, a pivot unit and a torsion spring. The support bracket has a pivot hole. The pivot unit is pivotally connected to the pivot hole of the support bracket and connected to the display unit. The torsion spring is mounted on the pivot unit and has an end portion coupled to the support bracket. When the support bracket reciprocally rotates with respect to the display unit, the supporting angels changes in a predetermined range.

In one embodiment, the support bracket further has a slot hole, and the end portion of the torsion spring unit is clamped in the slot hole.

In one embodiment, the support device further includes a case for containing the support bracket, the pivot unit and the torsion spring.

In one embodiment, the case and the flat surface are substantially parallel to each other when the support bracket rotates with respect to the display unit to the maximum rotation angle.

For making the above and other purposes, features and benefits become more readily apparent to those ordinarily skilled in the art, the preferred embodiments and the detailed descriptions with accompanying drawings will be put forward in the following descriptions.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
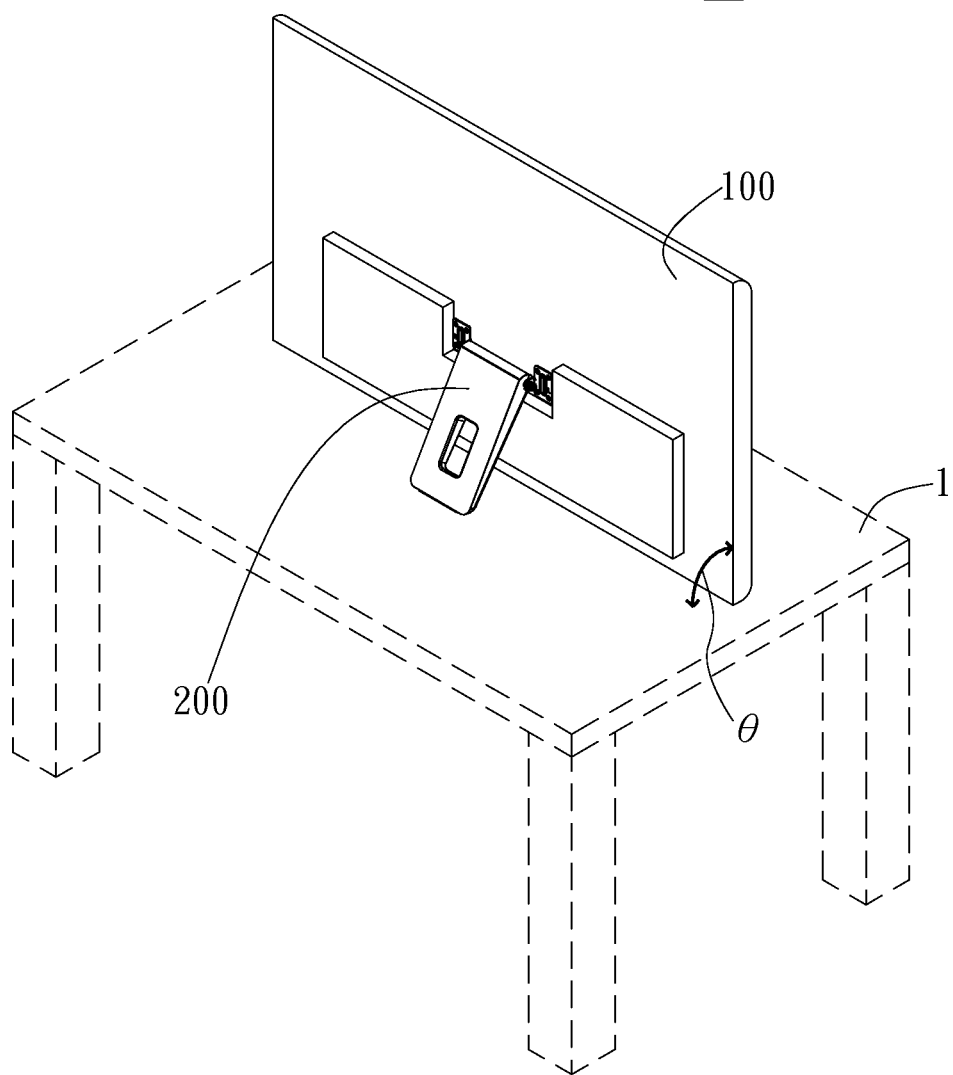
FIG. 1A is a schematic structural view of a display apparatus having a tilt angle with respect to a flat surface in accordance with an embodiment of the present invention.
Figure 1B:
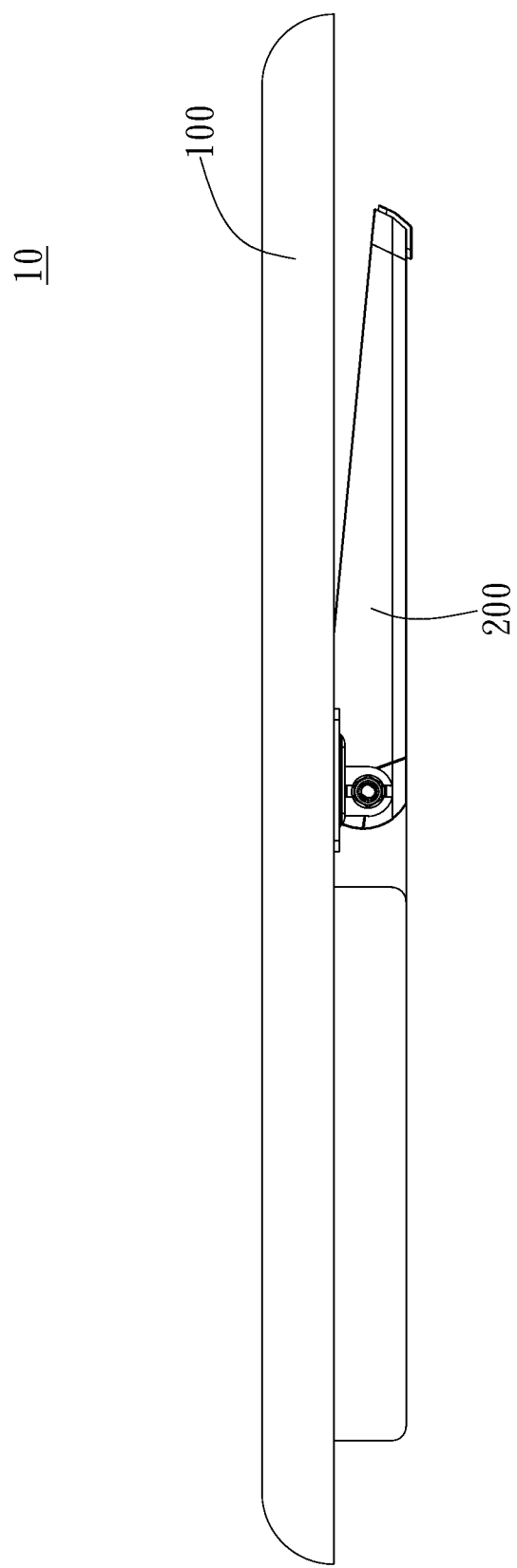
FIG. 1B is a schematic structural view of a display apparatus positioned at a maximum rotation angle in accordance with an embodiment of the present invention.

The present invention relates to a display apparatus, and more particularly to a display apparatus capable of being positioned within a large angle range (with respect to or in relation to the support device). Please refer to FIGS. 1A and 1B, which are schematic views of a display apparatus in accordance with an embodiment of the present invention. As shown in FIGS. 1A and 1B, the display apparatus 10 in the present embodiment includes a display unit 100 and a support device 200 connected to the display unit 100. In one embodiment, the display unit 100 may be any electronic device with display screen, such as a display screen with image display function only, a display device integrated with computer functions or a touch display device; however, the present invention is not limited thereto. The support device 200 supports the display unit 100 on a flat surface 1 (e.g., a desktop) with a supporting angle θ. As illustrated in FIG. 1A, for example, when the display apparatus 10 is used and the supporting angle θ is needed to be adjusted. preferably the support device 200 rotates with respect to the display unit 100 with a narrow angle. The display unit 100 can have an appropriate tilt angle with respect to the flat surface 1. The user can watch the information displayed on the display unit 100 more conveniently and comfortably. Alternatively, as illustrated in FIG. 1B, when the display apparatus 10 is used for data input on a touch screen of the display unit 100. Or the display unit 100 is to be packaged in a box, preferably the support device 200 rotates with respect to the display unit 100 to a relatively wide angle; thus, the display unit 100 is substantially positioned to lie on the flat surface 1 and the support device 200 substantially folds up with respect to the display unit 100, and a user can input data on the display unit 100 or store/package the display apparatus 10 more conveniently and comfortably. Therefore, through the support device 200, the display apparatus 10 of the embodiment of the present invention provides a variety of usage modes to meet user's requirements in various operating conditions. The structure of the support device 200 will be described in detail as follow with reference to related figures.

Figure 2A:
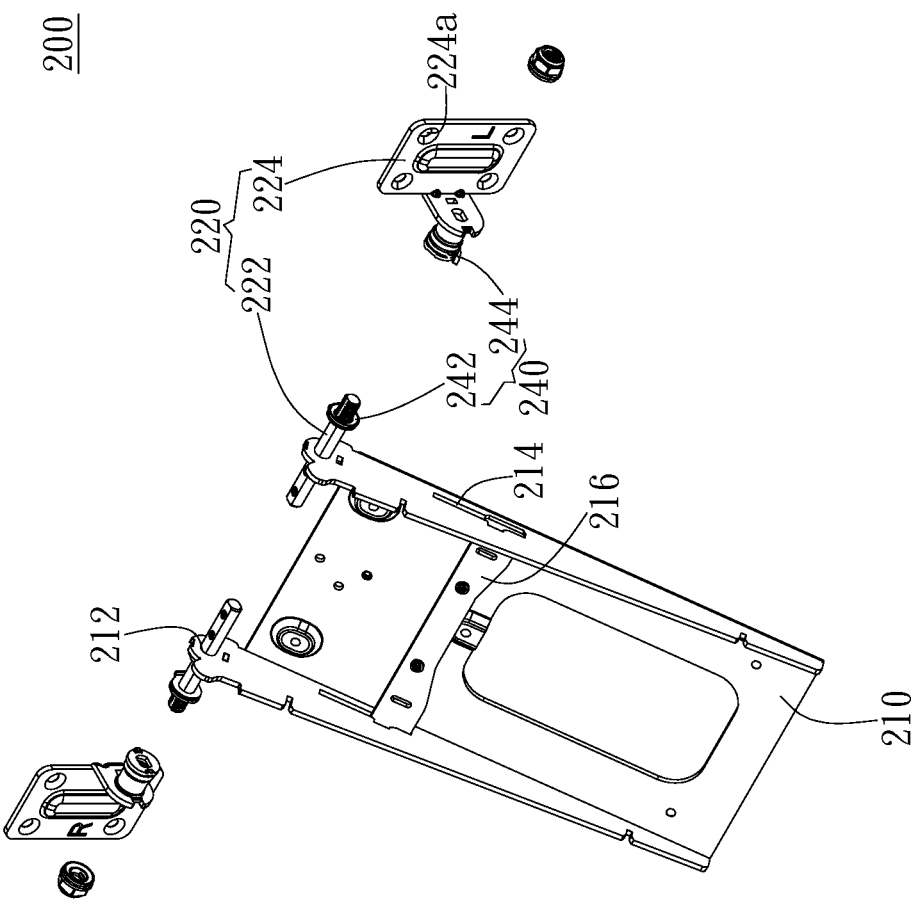
FIGS. 2A and 2B are schematic structural views of a support device of a display apparatus in accordance with an embodiment of the present invention.
Figure 2A:
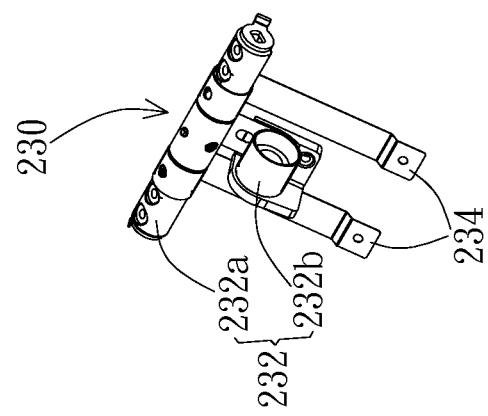
Figure 2B:
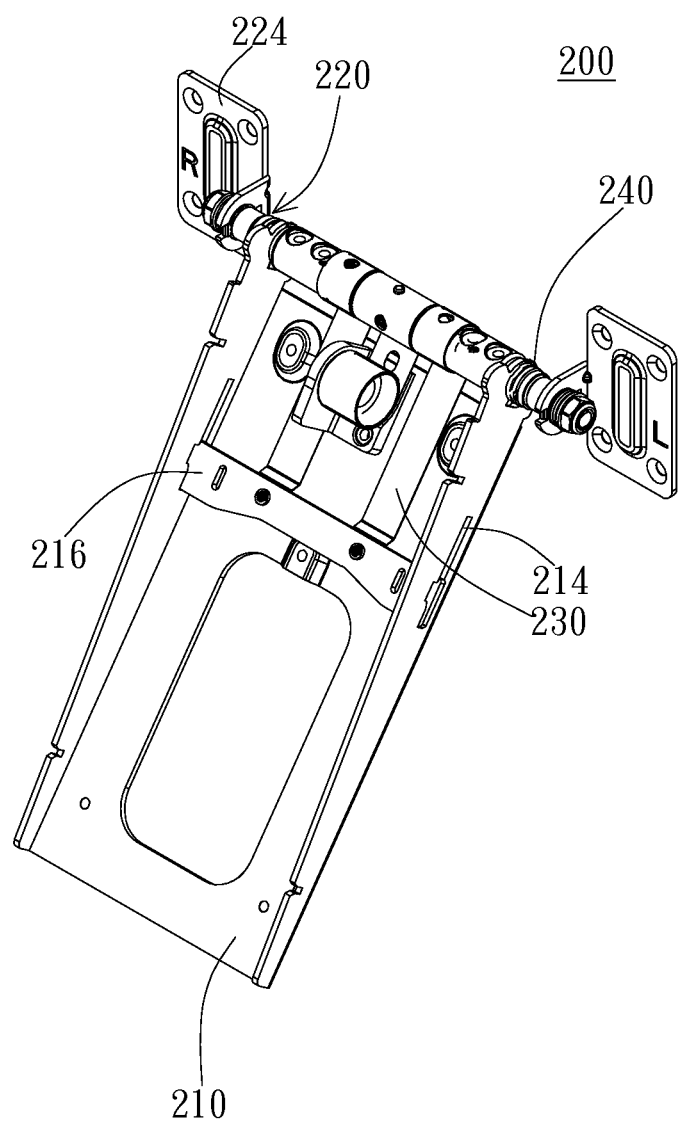

FIGS. 2A and 2B are schematic structural views of a support device of a display apparatus in accordance with an embodiment of the present invention. As shown in FIGS. 2A and 2B, the support device 200 in the present embodiment includes a support bracket 210, a pivot unit 220 and a constant force spring 230. Preferably, the support bracket 210 is a metal bracket (such as, but not limited to iron bracket, aluminum bracket or steel bracket) so as being able to provide the support device 200 with enhanced structural strength. Additionally, in one embodiment, the support bracket 210 may be made by metal sheets processed by stamping process. The support bracket 210 has a pivot hole 212 coupled to the pivot unit 220. Specifically, the support bracket 210 has two pivot holes 212, which are respectively formed on two opposite sidewalls and close to a top edge of the support bracket 210 and the pivot unit 220 can be inserted through the two pivot holes 212. In other words, the pivot unit 220 is inserted through the pivot holes 212 of the support bracket 210 and connected to the display unit 100. The pivot unit 220 includes a pivot element 222 and a connection element 224. Specifically, the pivot element 222 is inserted through the pivot hole 212, and the connection element 224 is connected to the display unit 100. In one embodiment, the connection element 224 may be a connection plate having a plurality of lock holes 224a, and accordingly the connection element 224 can be locked with the display unit 100 by screws.

The constant force spring 230 has a spring body 232 coupled to the pivot unit 220 and an end portion 234 movably coupled to the support bracket 210, so that the support bracket 210 can reciprocally rotate with respect to the display unit 100 in a predetermined rotation range. Specifically, the spring body 232 includes a sleeve portion 232a mounted on the pivot element 222 and a body portion 232b fixed to the support bracket 210. Thus, through making one end of the constant force spring 230 fixed and the other end thereof movable, the constant force spring 230 can be tensile or compressive in response to the rotation of the support bracket 210. The support bracket 210 has a groove 214. The groove 214 is formed along a sidewall of the support bracket 210 and has an extending direction parallel to the length direction of the support bracket 210. Moreover, the support bracket 210 further includes a slide plate 216 movably coupled to the groove 214 and connected to the end portion 234 of the constant force spring 230. Therefore, when the support bracket 210 rotates with respect to the display unit 100, the end portion 234 of the constant force spring 230 drives the slide plate 216 to move along the groove 214 of the support bracket 210.

It is to be noted that the connection between the end portion 234 of the constant force spring 230 and the slide plate 216 of the support bracket 210 can be realized by various means, such as screws/rivets or welding; however, the present invention is not limited thereto. Moreover, by connecting the support bracket 210, the pivot unit 220 and the constant force spring 230 through locking elements (such as screws and washers), the constant force spring 231 is relatively tensile or compressive thereby positioning the support bracket 210 when the support bracket 210 rotates with respect to the display unit 100.

Figure 3:
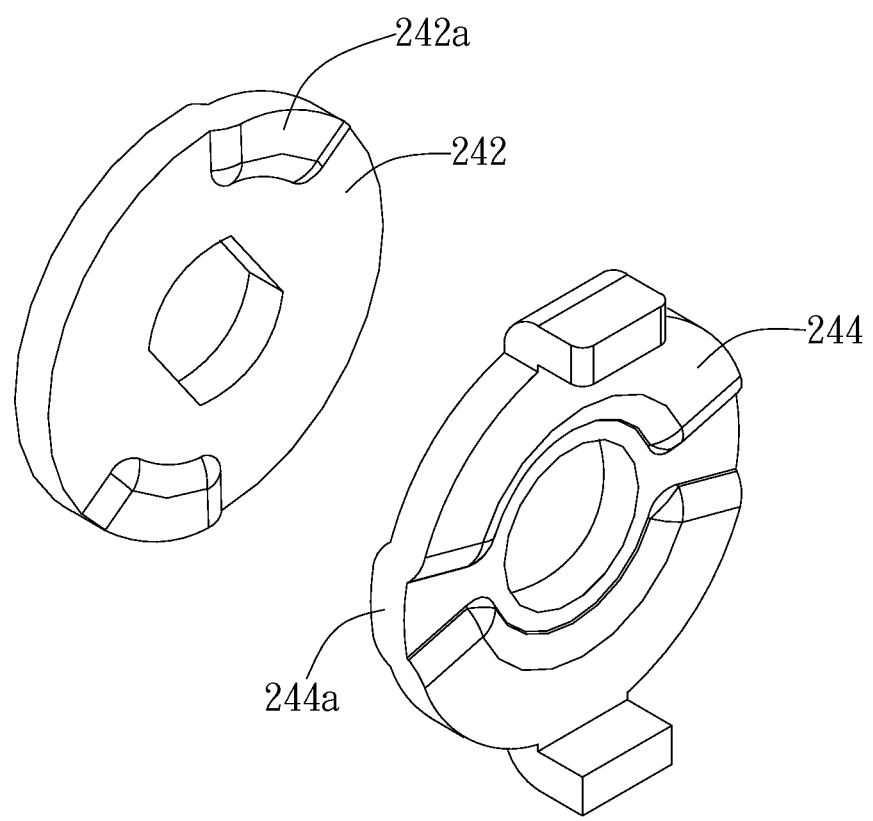
FIG. 3 is a schematic structural view of a limiting unit of a support device of a display apparatus in accordance with an embodiment of the present invention.

The support device 200 further includes a limiting unit 240. The limiting unit 240, which is disposed on the pivot unit 220 and close to the support bracket 210, is for limiting a maximum rotation angle of the support bracket 210 with respect to the display unit 100. FIG. 3 is a schematic structural view of a limiting unit of a support device of a display apparatus in accordance with an embodiment of the present invention. Please refer to FIGS. 2A and 3. The limiting unit 240 in the present embodiment includes a first washer 242 and a second washer 244. The first washer 242 has a first stopper portion 242a, and the second washer 244 has a second stopper portion 244a. When the support bracket 210 rotates with respect to the display unit 100, the first washer 242 rotates with respect to the second washer 244, and accordingly the first stopper portion 242a and the second stopper portion 244a move either toward or away from each other. In this embodiment, the first and second stopper portions 242a, 244a may be protrusions formed on the two opposite surfaces of the first and second washers 242, 244 respectively; however, the present invention is not limited thereto. In another embodiment, the first and second stopper portions 242a, 244a may be a pair of protrusion and concavity. One of the first and second washers 242, 244 (e.g., the first washer 242) is fixed to the pivot element 222, and the other one (e.g., the second washer 244) can be driven to rotate by the support bracket 210. When the support bracket 210 rotates with respect to the display unit 100 in an increased-angle direction, the rotatable washer (e.g., the second washer 244) rotates with respect to the fixed/non-rotatable washer (e.g., the first washer 242) thereby moving the first and second stopper portions 242a, 244a toward each other. Moreover, when the support bracket 210 keeps rotating with respect to the display unit 100 in an increased-angle direction so that the rotatable washer (e.g., the second washer 244) stops rotating with respect to the fixed washer (e.g., the first washer 242) due to the first and second stopper portions 242a, 244a are being relatively close and have an interference with each other, the support bracket 210 stops further rotating with respect to the display unit 100 and accordingly the display unit 100 is positioned at the maximum rotation angle. In other words, when the support bracket 210 rotates with respect to the display unit 100 to the maximum rotation angle (as shown in FIG. 1B), the first and second stopper portions 242a, 244a interfere with each other thereby limiting the support bracket 210 from further rotating with respect to the display unit 100.

Moreover, when the first and second stopper portions 242a, 244a interfere with each other to limit the support bracket 210 from rotating with respect to the display unit 100, a user has to apply a force to release the interference between the first and second stopper portions 242a, 244a, so that the support bracket 210 can rotate with respect to the display unit 100 in a decreased-angle direction. As a result, the rotatable washer (e.g., the second washer 244) rotates with respect to the fixed washer (e.g., the first washer 242) and the first and second stopper portions 242a, 244a move away from each other; and eventually, the support bracket 210 returns back to the initial position with respect to the display unit 100. In other words, when the support bracket 210 rotates with respect to the display unit 100 to the maximum rotation angle and the limiting unit 240 fixes the support bracket 210 at the maximum rotation angle, the support bracket 210 will not automatically return back to the initial position. Alternatively, when the support bracket 210 does not rotate with respect to the display unit 100 to the maximum rotation range, the limiting unit 240 will not limit the rotation of the support bracket 210 and accordingly the support bracket 210 can automatically return back to the initial position by the force provided by the constant force spring 230. It is to be noted that the aforementioned "predetermined rotation range" herein refers to an angle range from the initial position of the support bracket 210 supplied with no force with respect to the display unit 100 to a position of the support bracket 210 supplied with a force and substantially fold up with respect to the display unit 100; however, the present invention is not limited thereto.

Figure 4:
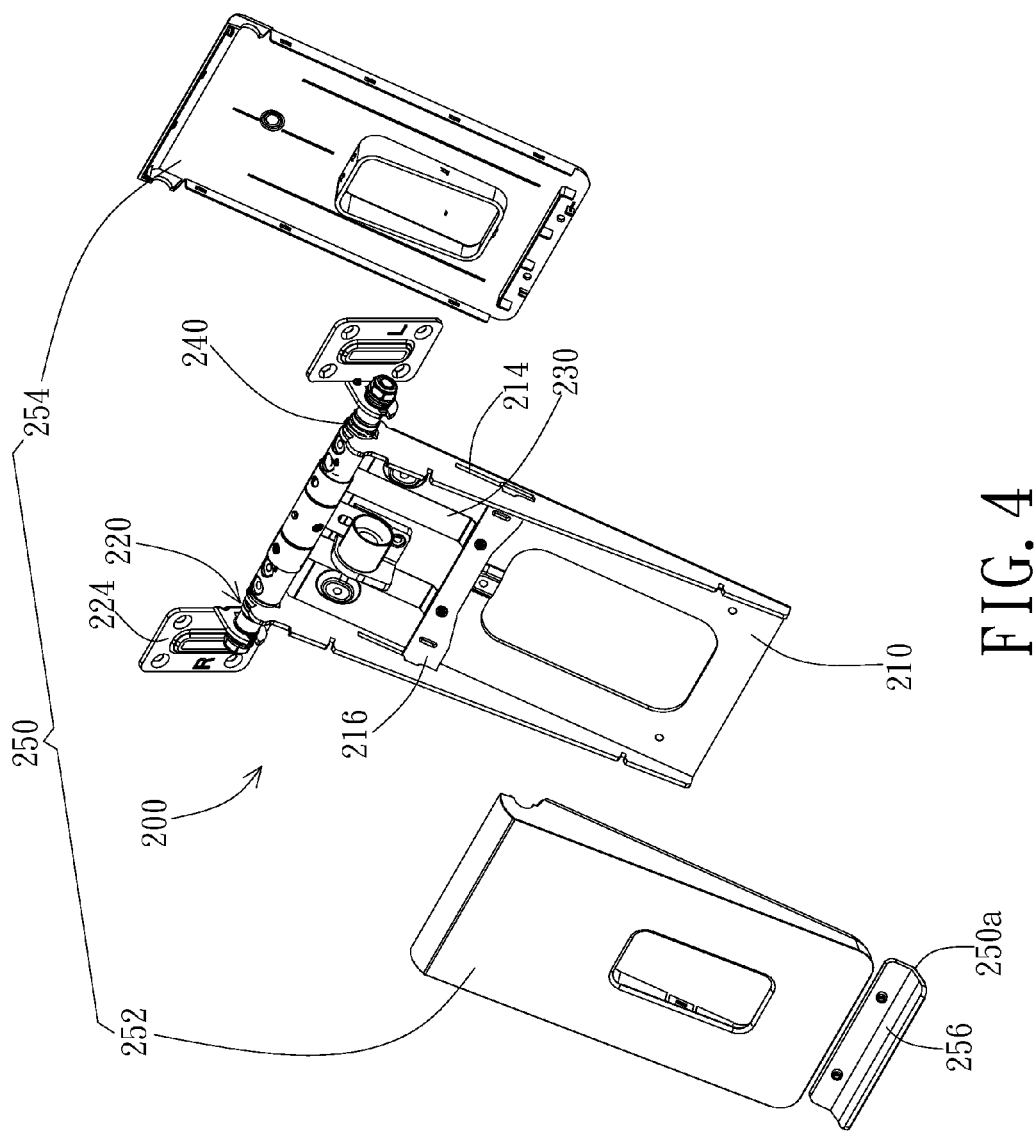
FIGS. 4 and 5 are schematic structural views of a support device of a display apparatus quipped with a case in accordance with an embodiment of the present invention.

In one embodiment, as shown in FIG. 4, the support device 200 further includes a case 250 for containing the support bracket 210, the pivot unit 220 and the constant force spring 230 therein. Specifically, the case 250 may includes a first case body 252 and a second case body 254. A containing space is formed when the first and second case bodies 252, 254 are coupled to each other, and the support bracket 210, the pivot unit 220 and the constant force spring 230 can be disposed in the containing space; thus, the support device 200 can have an aesthetic appearance. Moreover, one end of the case 250 has a cambered surface 250a so that the case 250 and the flat surface 1 can have a line contact while the support device 200 supports the display unit 100 on the flat surface 1. Specifically, the case 250 may further include a cambered plate 256 disposed at the end of the case 250 opposite to the pivot unit 220. Thus, through the line contact between the flat surface 1 and the cambered plate 256, a user can operate the display apparatus 10 more conveniently and easily. For example, when the support device 200 supports the display unit 100 on the flat surface 1, a user can adjust the support device 200 to have a specific angle with respect to the display unit 100 by applying a relatively small force to slide the support device 200 on the flat surface 1. In this embodiment, the cambered surface 250a of the case 250 is the outer surface of the cambered plate 256. Instead of being provided with the cambered plate 256, the case 250 may be directly designed to have a cambered edge for having a line contact with the flat surface 1 in another embodiment.

Furthermore, in one preferred embodiment, the case 250 is substantially parallel to the flat surface 1 when the support bracket 210 rotates to the maximum rotation angle. In other words, the maximum rotation angle is defined as an angle when the rotation of the support bracket 210 makes the case 250 substantially parallel to the flat surface 1, as shown in FIG. 1B. Therefore, the display unit 100 can stably lie on the flat surface 1 when the support bracket 210 rotates to the maximum rotation angle. It is to be noted that the second case body 254 of the case 250 and the support bracket 210 are two individual components in this embodiment. However, in another embodiment, the support bracket 210 and the second case body 254 may be integrated to a signal component by the insert molding technology; and correspondingly, the first case body 252 is coupled to the support bracket 210.

Figure 5:
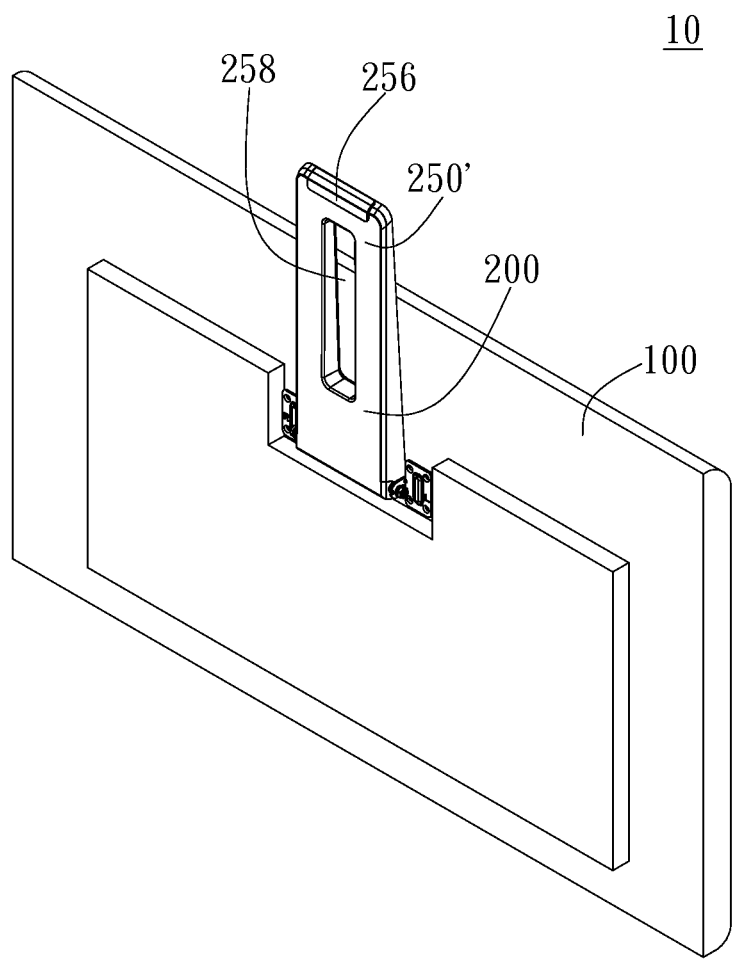

In addition, the case may be further designed to have a hold/lift function in another embodiment. As shown in FIG. 5, the case 250' has a handle structure 258, through which a user can hold/lift the display apparatus 10. Specifically, the handle structure 258 is designed to have a hollow portion that is close to the cambered plate 256. In addition, when the support device 200 rotates to and positioned at the maximum rotation angle, preferably the case 250' protrudes from an edge of the display unit 100. Thus, through the hollow portion of the handle structure 258, a user can hold/lift the support device 200 as well as the display apparatus 10; and consequentially, the display apparatus 10 has improved moveability.

Figure 6A:
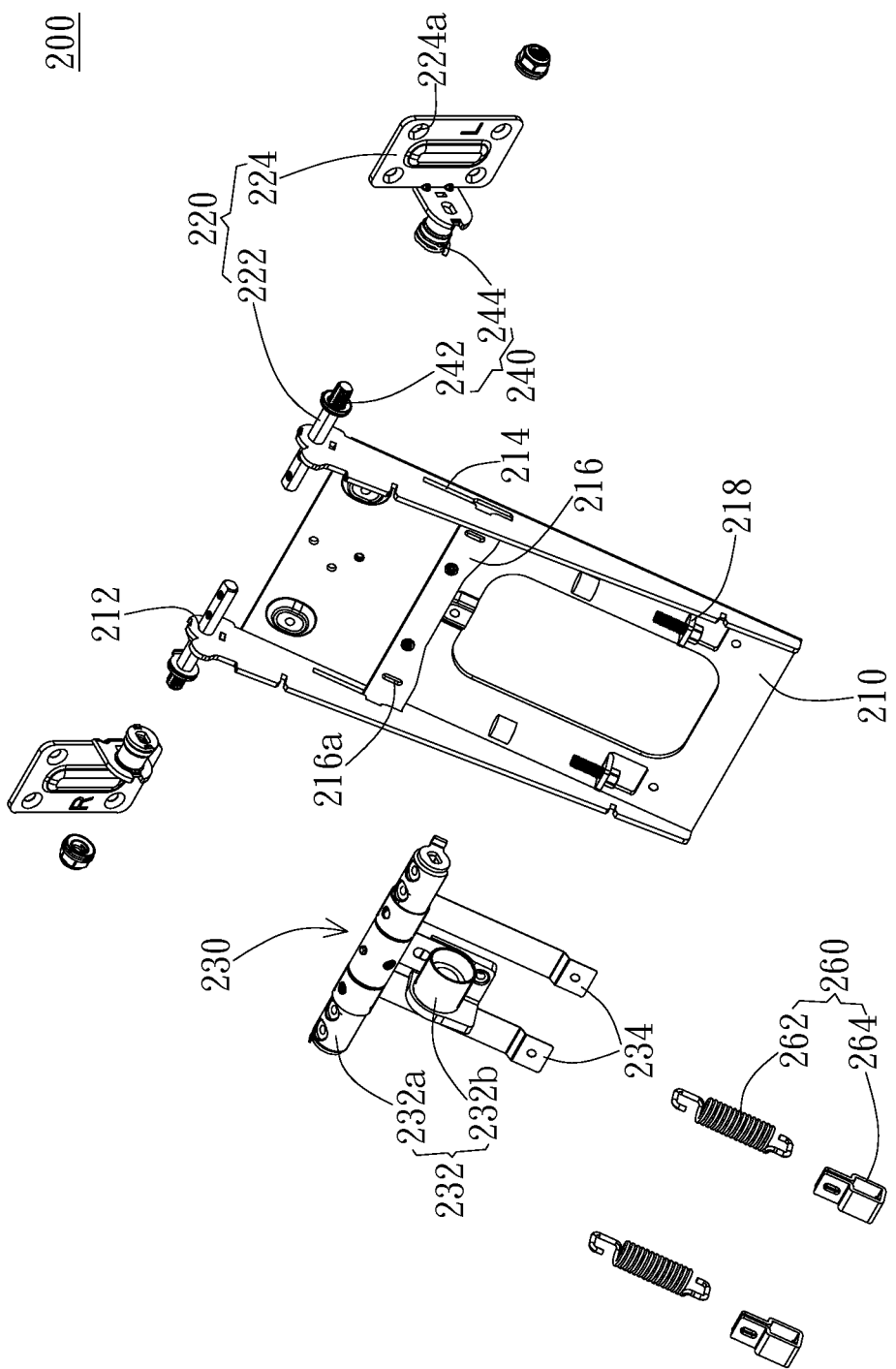
FIGS. 6A and 6B are schematic structural views of a support device, designed and developed based on the support device of FIG. 2A, in accordance with another embodiment of the present invention.
Figure 6B:
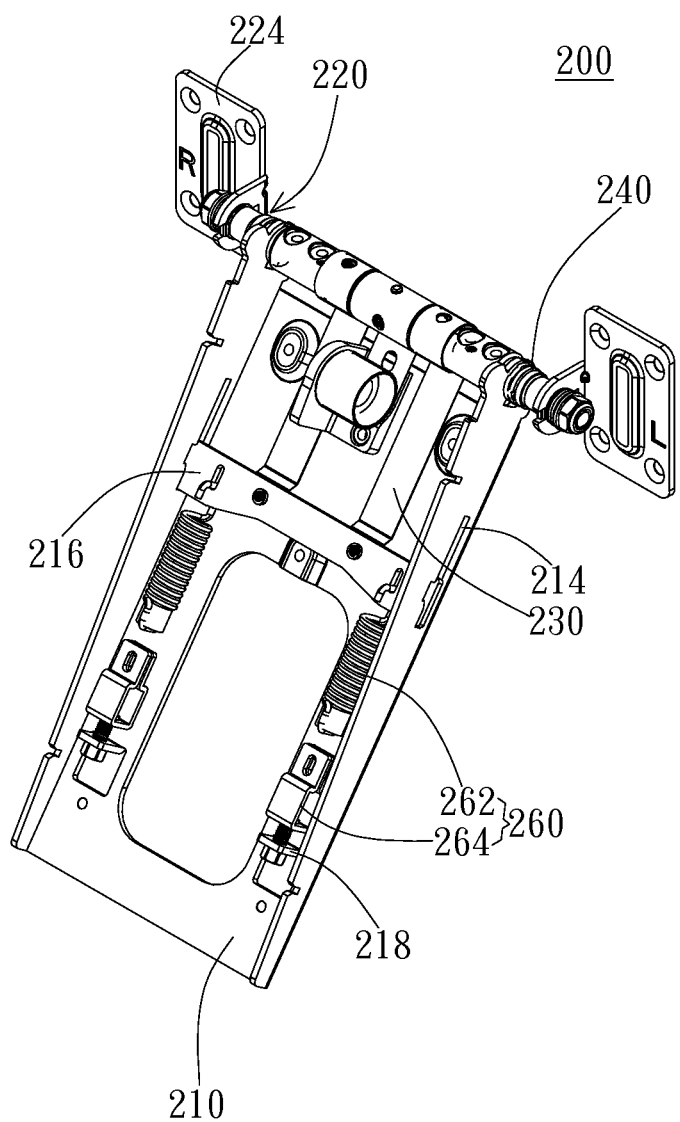

FIGS. 6A, 6B are schematic structural views of a support device, developed based on the support device of FIG. 2A, in accordance with another embodiment of the present invention. As shown in FIGS. 6A and 6B, the support device 200 in the present embodiment may further include an extension spring module 260 connected to the end portion 234 of the constant force spring 230 and the support bracket 210. Specifically, the support bracket 210 includes a connection element 218, disposed relatively away from the pivot unit 220 with respect to the slide plate 216. The connection element 218 may be a plate formed by bending the support bracket 210 and preferably has a screw hole, through which the extension spring module 260 is locked. In this embodiment, the extension spring module 260 includes an extension spring 262 and a fixed element 264. One end of the extension spring 262 is connected to the connection element 218 of the support bracket 210 via the fixed element 264 and the other end of the extension spring 262 is coupled to the slide plate 216. Specifically, one end of the extension spring 262 is clamped in and fixed to the fixed element 264 and the fixed element 264 is locked with the connection element 218 via screws; and the other end of the extension spring 262 is clamped in the hole 216a of the slide plate 216. Therefore, when the support bracket 210 rotates with respect to the display unit 100, the constant force spring 230 and the extension spring 262 corporately function as an elastic element of the support bracket 210 to support the display unit 100 at a specific rotation angle. In another embodiment, it is to be noted that the extension spring module 260 may not include the fixed element 264. Specifically, through hooking the two ends of the extension spring module 260 to the connection element 218 and the slide plate 216 respectively, the extension spring 262 and the constant force spring 230 would still have a connected movement.

Figure 7:
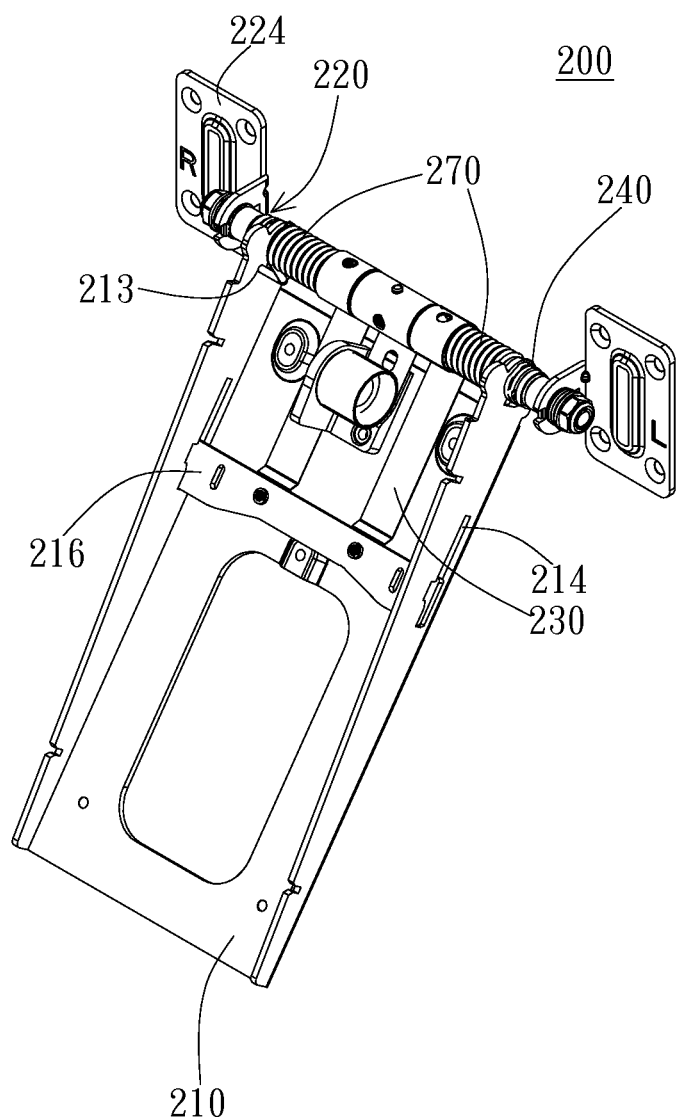
FIG. 7 is a structural view of a support device, designed and developed based on the support device of FIG. 2A, in accordance with still another embodiment of the present invention.

FIG. 7 is a structural view of a support device, developed based on the support device of FIG. 2A, in accordance with still another embodiment of the present invention. As shown in FIG. 7, the support device 200 in the present embodiment may further include a torsion spring 270 axially mounted on the pivot unit 220 and close to the constant force spring 230. Specifically, the support bracket 210 has a plurality of slot holes 213 formed on the two opposite sidewalls of the support bracket 210 and close to the pivot holes 212 (FIG. 2A), respectively. One end of the torsion spring 270 is clamped in the slot hole 213, and the other end of the torsion spring 270 is clamped in a side of the constant force spring 230, so that the torsion spring 270 is mounted onto the pivot element 222 and disposed between the sidewall of the support bracket 210 and the sleeve portion 232a of the constant force spring 230. Through the torsion spring 270 and the constant force spring 230, the support bracket 210 in this embodiment can support the display unit 100 on the flat surface 1 with a supporting angle and reciprocally rotate with respect to the display unit 100.

Figure 8:
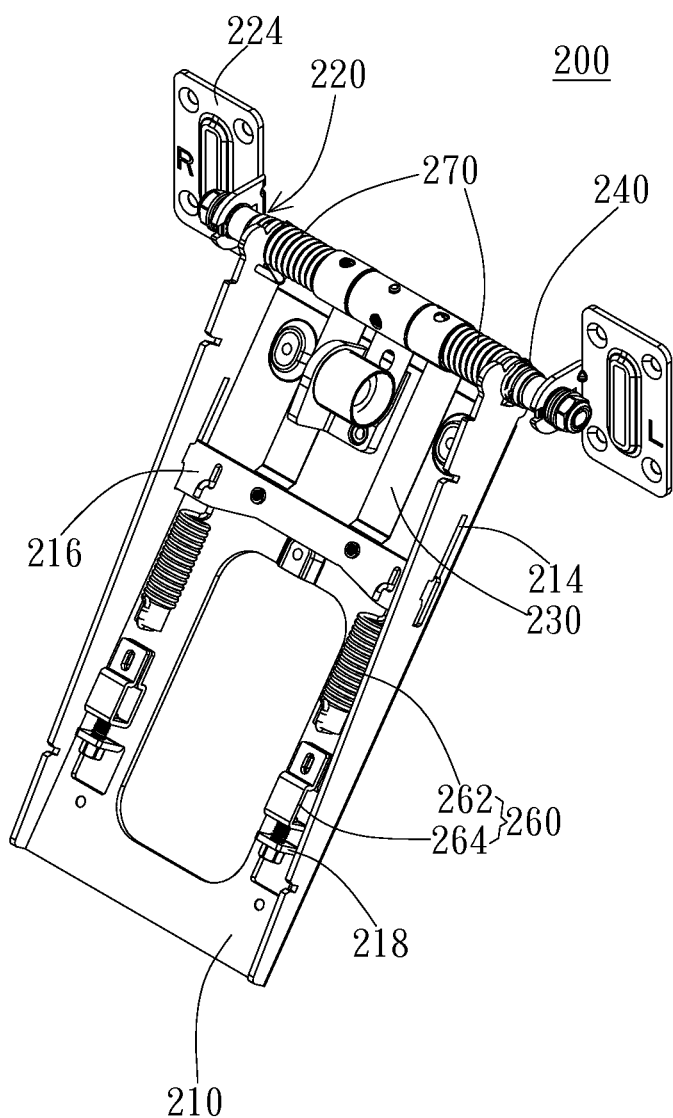
FIG. 8 is a structural view of a support device, designed and developed based on the support device of FIG. 2A, in accordance with yet another embodiment of the present invention.

FIG. 8 is a structural view of a support device, developed based on the support device of FIG. 2A, in accordance with yet another embodiment of the present invention. As shown in FIG. 8, the support device 200 in the present embodiment includes both of the aforementioned extension spring 260 and the torsion spring 270. Because the functions and structures of extension spring 260 and the torsion spring 270 have been described above, no redundant detail is to be given herein. Through a cooperation of the constant force spring 230, the extension spring 260 and the torsion spring 270, the support bracket 210 in the present embodiment can support the display unit 100 on the flat surface 1 with a supporting angle and reciprocally rotate with respect to the display unit 100. In addition, because of the inclusion of both of the aforementioned extension spring 260 and the torsion spring 270, the support device 200 in the present embodiment can support a heavier display unit 100.

Figure 9A:
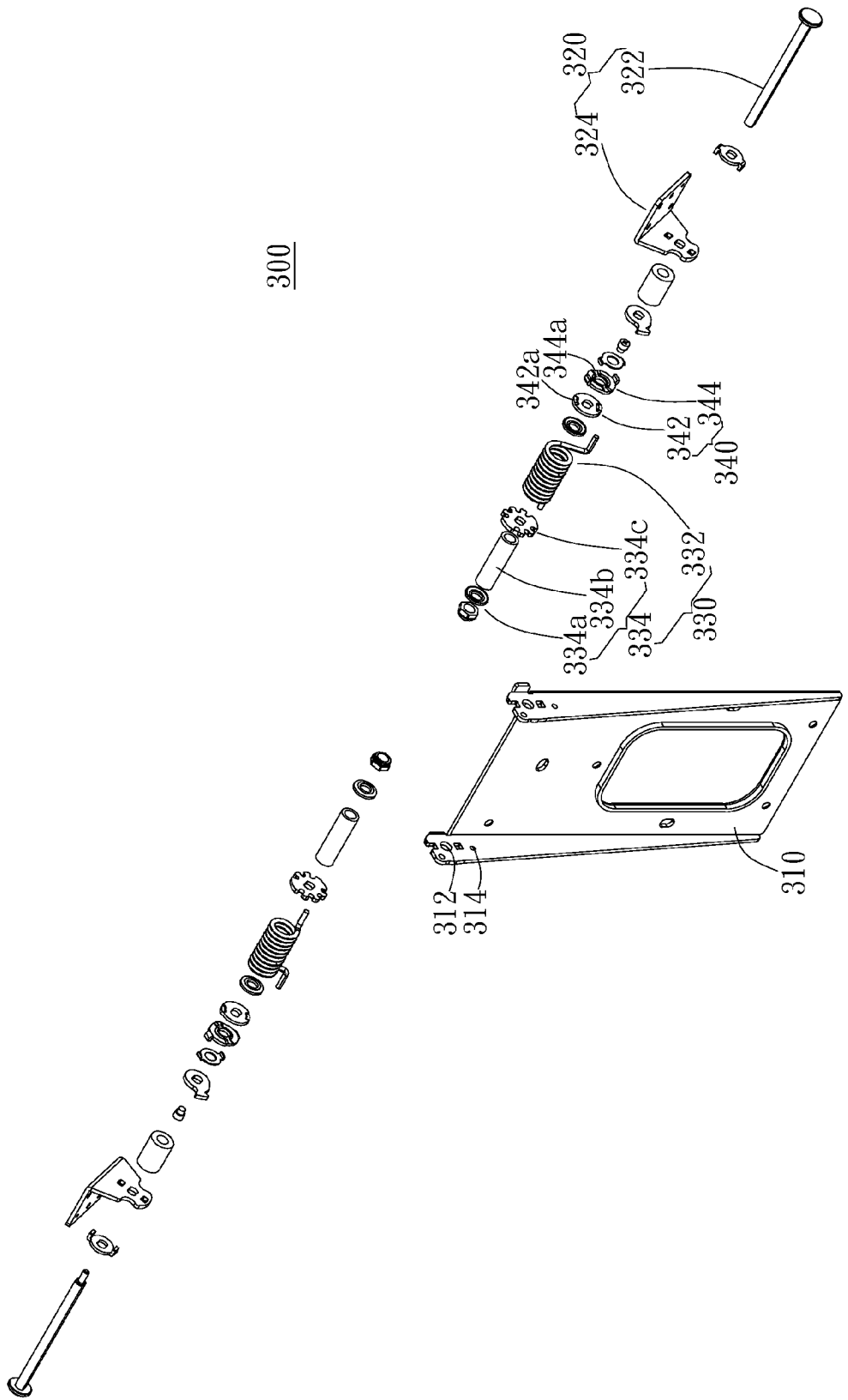
FIGS. 9A and 9B are structural views of a support device in accordance with still yet another embodiment of the present invention.
Figure 9B:
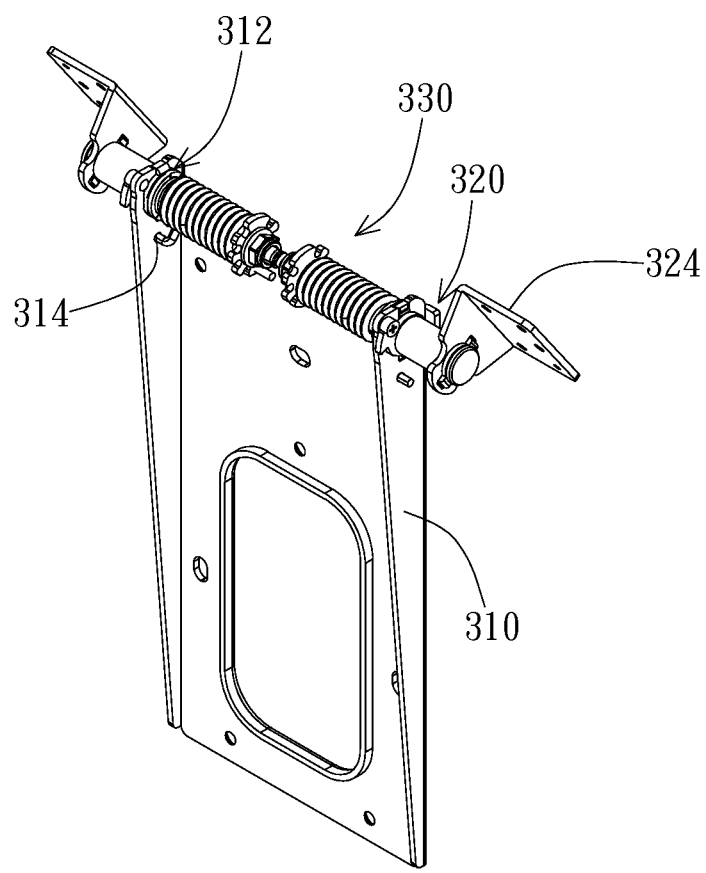

The support device can position the display unit with a supporting angle in a predetermined range by using the torsion spring instead of the constant force spring and support the position of the display unit at a relatively large angle by using the limiting unit; thus, various operating conditions demanded by users are satisfied. FIGS. 9A, 9B are structural views of a support device in accordance with still yet another embodiment of the present invention. As shown in FIGS. 9A and 9B, the support device 300 in the present embodiment includes a support bracket 310, a pivot unit 320 and a torsion spring unit 330. Similar to the aforementioned support bracket 210, the support bracket 310 has two pivot holes 312 respectively formed on two opposite sidewalls thereof. The pivot unit 320 is inserted through the pivot holes 312 of the support bracket 310 and connected to the display unit 100. The torsion spring unit 330 is mounted on the pivot unit 320, and has its one end coupled to the support bracket 310; thus, the support bracket 310 can reciprocally rotate with respect to the display unit 100 with a supporting angle. It is to be noted that the support bracket 310, the pivot unit 320 and the torsion spring unit 330 are connected to one another by locking elements (such as screws, washers and etc.), thus, the torsion spring unit 330 can twist to position the support bracket 310 when the support bracket 310 rotates with respect to the display unit 100. Specifically, the support bracket 310 has two slot holes 314 respectively formed on two sidewalls thereof and located close to the pivot hole 312. The pivot unit 320 includes a pivot element 322 and a connection element 324. The pivot element 322 of the pivot unit 320 is inserted through the pivot hole 312 of the support bracket 310 and the connection element 324 is connected to display unit 100. The torsion spring unit 330 includes a torsion spring 332, and the connection element 334 includes one or more washers 334a, sleeve elements 334b and stopper plates 334c. The torsion spring 332 is mounted on the pivot element 322 through the sleeve element 334b. One end of the torsion spring 332 is clamped in the slot hole 314 of the support bracket 310 and the other end of the torsion spring 332 is clamped in, for example, the stopper plate 334c. Thus, when the support bracket 310 rotates with respect to the display unit 100, the torsion spring 332 can apply a force to the support bracket 310 for supporting the display unit 100.

In addition, to position the display unit 100 at the maximum rotation angle, the support device 300 may further include a limiting unit 340 disposed on the pivot unit 320 and located close to the support bracket 310. The limiting unit 340 is used to limit the maximum rotation angle of the support bracket 310 with respect to the display unit 100. It is to be noted that the limiting unit 340 in the present embodiment has function and structure similar to that of the limiting unit 240 in FIGS. 2A and 3. Thus, please refer to the description relating to FIGS. 2A and 3 for the details about the structures of the first washer 342, the second washer 344, the first stopper portion 342a and the second stopper portion 344a; and no redundant detail is to be given herein. Similarly, when the support bracket 310 rotates with respect to the display unit 100 to the maximum rotation angle, the limiting unit 340 fixes the support bracket 310 at the maximum rotation angle and the support bracket 310 will not automatically return back to the initial position. Alternatively, when the support bracket 310 does not rotate with respect to the display unit 100 at the maximum rotation range, the limiting unit 340 will not limit the rotation of the support bracket 310, so that the support bracket 310 can return back to the initial position automatically by the force provided by torsion spring 332.

Moreover, the support device 300 may include the case as shown in FIGS. 4 and 5 for containing the support bracket 310, the pivot unit 320 and the torsion spring unit 330 therein. When the support bracket 310 rotates to the maximum rotation angle, preferably the case and the flat surface are substantially parallel to each other. Please refer to the description relating to FIGS. 4 and 5 for the details about the case, no redundant detail is to be given herein.

In summary, compared with the prior art using the drawstring, the display apparatus can have larger angle by using the constant force spring and/or the torsion spring of the support device to provide support force. Because the display apparatus can be positioned at various angles, various operating conditions demanded by users are satisfied, the reciprocal mechanism of the support device is simplified and the assembly cost is reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A display apparatus, comprising:
a display unit; and
a support device, connected to the display unit to support the display unit on a flat surface with a supporting angle, the support device comprising:
a support bracket, having a pivot hole;
a pivot unit, pivotally connected to the pivot hole of the support bracket and connected to the display unit; and
a constant force spring, having a spring body mounted on the pivot unit and fixed to the support bracket, wherein when the supporting angle changes in a predetermined range, an end portion of the spring body is movably connected to the support bracket.

2. The display apparatus according to claim 1, wherein the support bracket has a groove, and the end portion moves along the groove while the support bracket rotates with respect to the display unit.

3. The display apparatus according to claim 1, wherein the support device further comprises a torsion spring, the support bracket further has a slot hole, the torsion spring is axially mounted on the pivot unit and adjacent to the constant force spring, one end of the torsion spring is clamped in the slot hole, the torsion spring and the constant force spring cooperatively make the support device support the display unit on the flat surface with the supporting angle and make the support bracket reciprocally rotate with respect to the display unit.

4. The display apparatus according to claim 1, wherein the support device further comprises a limiting unit disposed on the pivot unit and adjacent to the support bracket, the limiting unit limits the supporting angle to a maximum rotation angle.

5. The display apparatus according to claim 4, wherein when the supporting angle is less than the maximum rotation angle, the constant force spring forces the support bracket to return back automatically; when the supporting angle reaches to the maximum rotation angle, the support bracket is limited by the limiting unit to fix at a position and does not automatically return back.

6. The display apparatus according to claim 4, wherein the limiting unit comprises a first washer and a second washer, the first washer has a first stopper portion and the second washer has a second stopper portion, wherein when the support bracket rotates with respect to the display unit, the first washer rotates with respect to the second washer and thereby moving the first and second stopper portions either toward or away from each other.

7. The display apparatus according to claim 6, wherein when the support bracket rotates with respect to the display unit to the maximum rotation angle, the first and second stopper portions interfere with each other to limit the support bracket to further rotate with respect to the display unit.

8. The display apparatus according to claim 5, wherein the support device further comprises a case for containing the support bracket, the pivot unit and the constant force spring therein.

9. The display apparatus according to claim 8, wherein the display unit lies on the flat surface when the support bracket rotates with respect to the display unit to the maximum rotation angle.

10. The display apparatus according to claim 9, wherein the case has a handle structure, through which the case is held.

11. The display apparatus according to claim 8, wherein one end of the case has an cambered surface, through which the case and the flat surface have a line contact while the support device supports the display unit on the flat surface.

12. The display apparatus according to claim 1, wherein the support device further comprises an extension spring module connected to the end portion of the constant force spring and the support bracket.

13. A display apparatus, comprising:
a display unit; and
a support device, connected to the display unit to support the display unit on a flat surface with a supporting angle, the support device comprising:
a support bracket, having a pivot hole, a sidewall and a groove formed on the sidewall;
a pivot unit, pivotally connected to the pivot hole of the support bracket and connected to the display unit; and
a constant force spring, having a spring body coupled with the pivot unit, wherein when the supporting angle changes in a predetermined range, an end portion of the spring body is movably connected to the support bracket and moves along the groove while the support bracket rotates with respect to the display unit.

\* \* \* \* \*